No. 840,082. PATENTED JAN. 1, 1907.
J. R. MILLER.
LIFTING MECHANISM.
APPLICATION FILED MAR. 10, 1906.
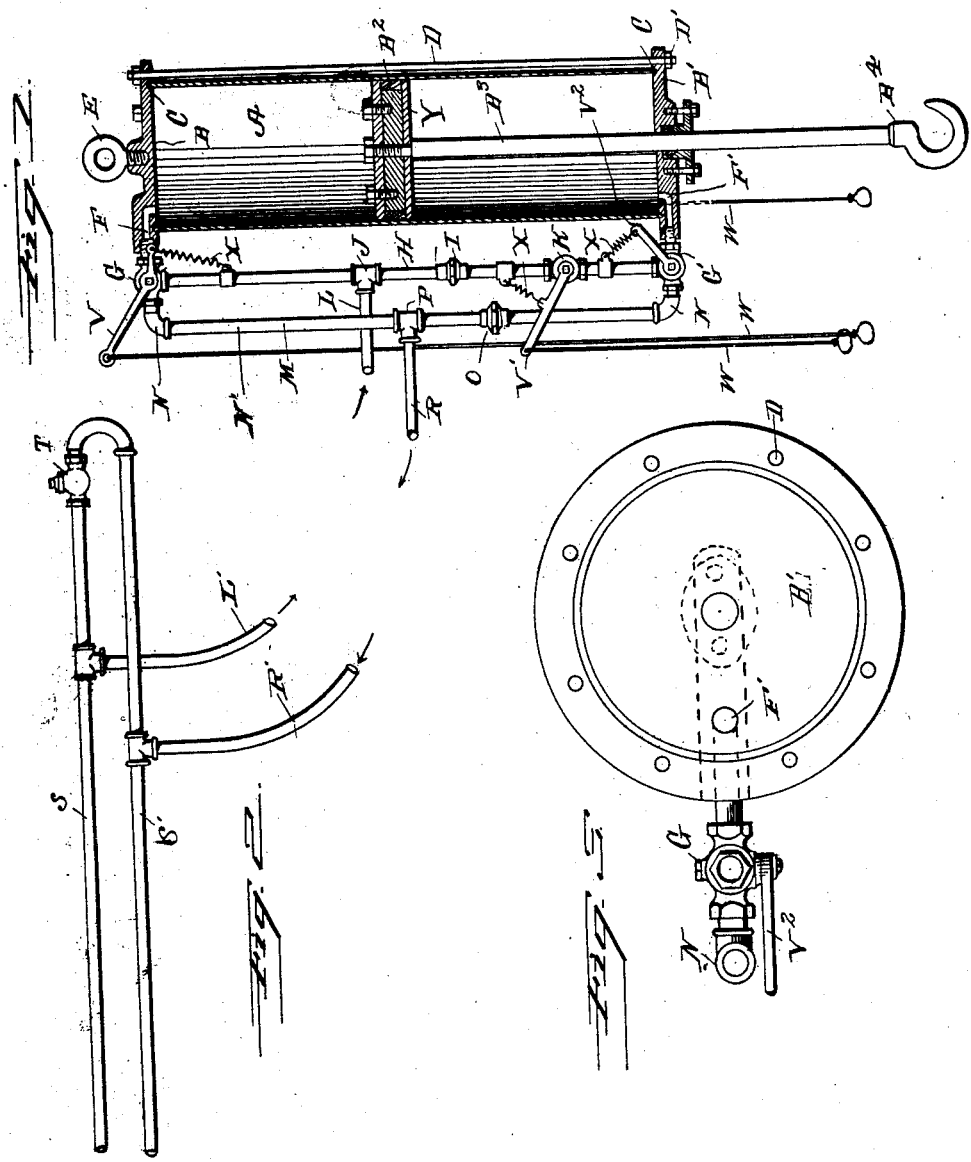

UNITED STATES PATENT OFFICE.

JOSEPH R. MILLER, OF MANSFIELD, OHIO, ASSIGNOR OF ONE-HALF TO WILLIAM MICHAEL, OF MANSFIELD, OHIO.

LIFTING MECHANISM.

No. 840,082.　　　　Specification of Letters Patent.　　　　Patented Jan. 1, 1907.

Application filed March 10, 1906. Serial No. 305,264.

*To all whom it may concern:*

Be it known that I, JOSEPH R. MILLER, a citizen of the United States, residing at Mansfield, in the county of Richland and State of Ohio, have invented certain new and useful Improvements in Lifting Mechanism, of which the following is a specification.

My invention relates to improvements in lifting mechanism, and has for its object to provide means for lifting weights either by compressed air or any suitable liquid by forcing the same under a piston within a cylinder, said cylinder suspended from a suitable beam or a movable support, so that it may be operated either by hand or power.

My invention further has for its object to provide a cheap, durable, and efficient mechanism for the purpose stated.

These objects I accomplish by the device illustrated in the accompanying drawings, in which—

Figure 1 is a vertical sectional view of my improved lifting mechanism to be operated by compressed air or liquid pressure. Fig. 2 is a plan view of pipe connections from the compressed-air tank or pump. Fig. 3 is an enlarged detached view of the lower cylinder-head and pipe connections looking downward.

Similar figures of reference indicate the several parts throughout the several views.

Referring first to the compressed-air or steam operated mechanism, as fully illustrated in Figs. 1, 2, and 3, the letter A designates the cylinder; B and B', the upper and lower heads, respectively. The said heads are provided with annular grooves or channels C, in which fit the ends of the cylinder. The said cylinder is clamped between the heads by means of the bolt-rods D, passing through the heads and having the nuts D' mounted on the ends thereof.

The upper head B is provided with a ring or eyebolt E for securing or suspending the cylinder to any suitable trolley or carriage placed upon trackways on a carrier-beam. The upper and lower cylinder-heads are provided with inlet-ports F and F', respectively. The said ports act for the admission and exhaust for the compressed air or liquid which may be used. The flow to the ports F and F' is controlled by the three-way cocks G and G'. The said cocks are connected together by the pipe connection H. The pipes are screwed into the three-way cocks and connected together by the pipe-union I. The said pipe is also provided with the T connection J and stop-valve K, and this connection forms the complete supply to the cylinder. A nipple is screwed within the T-joint J, to which is attached rubber hose.

N' indicates a vertical pipe connected to the three-way valves G G' with the elbows N N. The said pipe is also provided with a union O and T-joint P. This pipe is the discharge or exhaust connection. The T-joint is also provided with a nipple and hose connection R.

S and S' designate a line of pipes, which may be of any length and secured to the side of the building. The pipe S is the supply-pipe, and the end may be connected with the compressed-air tank or to a pump. When compressed air is used, the hose connection to the nipple R is dispensed with, as the air would exhaust through the opening in the T-joint into the room; but should liquid be used the connection would then be made to carry the exhaust liquid back through the pipe S' into the supply-tank. The supply-pipe S is provided with a tension-valve T, which may be regulated to stand any pressure necessary. The object of the said valve is to allow the air or liquid to escape should the pressure become too great.

The valves G G' and K are provided with levers V, V², and V', respectively, and suitable hand or rod connections W W W are attached to the ends of each lever. Coil-springs X X X are also connected to the levers and to suitable fastenings on the pipe H to retain the valves in the normal position.

Y represents the piston-head, which is of common construction packed with suitable flexible packing B².

B³ represents the piston or lifting rod, provided at its lower end with a suitable hook B⁴.

The operation of the power-lift is somewhat similar to the hand-machine. The end of the pipe S is connected with a force-pump or compressed-air cylinder, and the pipes L and L' and R and R' are connected together by rubber hose when a liquid is used. When the operator wishes to raise a load, the valves K and G' are opened, allowing the air or liquid to pass through the said valves and through the port F' into the cylinder below the piston, forcing the same upward and carrying the load. The valve G being open to the upper portion of the cylinder, the liquid therein passes through the valve into the pipe M, discharging through the hose into the discharge-pipe S', from thence into the liquid-tank. The tension-valve T is to allow the air or liquid to escape when the lift is not in use.

I claim—

1. In a power lifting-machine, a cylinder provided with heads formed with inlet-ports, three-way valves connected with the inlet-ports, a vertical pipe connection between the valves, a globe-valve and a T connection placed in line of said pipe, the said valves provided with levers, said levers held in normal position by coil-springs, a vertical discharge-pipe connecting the three-way valves, flexible connections from the supply and discharge to stationary supply and discharge pipes, a piston and piston-rod within the cylinder adapted to lift the load by compressed air or liquid, as set forth.

2. In a power lifting mechanism, the combination with a cylinder adapted for suspension, said cylinder having heads provided with inlet-ports, a piston within the cylinder provided at its lower end with a hook, of three-way valves connected with the inlet-ports, a vertical supply-pipe between said valves, and a discharge-pipe connected between the valves.

In testimony whereof I affix my signature in presence of two witnesses.

JOSEPH R. MILLER.

Witnesses:
W. H. BOWERS,
WILLIAM MICHAEL.